United States Patent [19]

Lindemann

[11] Patent Number: 4,626,268

[45] Date of Patent: Dec. 2, 1986

[54] PROCESS FOR MANUFACTURING A PRODUCT SUITABLE FOR PRODUCING PURE QUARTZ GLASS AS WELL AS A PROCESS FOR PRODUCING PURE QUARTZ GLASS FROM THIS PRODUCT

[76] Inventor: Gerhard Lindemann, Clausiusstr. 40, D-6450 Hanau 1, Fed. Rep. of Germany

[21] Appl. No.: 713,788

[22] Filed: Mar. 20, 1985

[30] Foreign Application Priority Data

Mar. 20, 1984 [DE] Fed. Rep. of Germany ....... 3410200

[51] Int. Cl.$^4$ ............................................. C03C 15/00
[52] U.S. Cl. ......................................... 65/134; 65/17; 65/18.3; 65/18.4
[58] Field of Search ............... 156/623 Q; 65/17, 18.1, 65/18.2, 18.3, 18.4, 31, 29

[56] References Cited

U.S. PATENT DOCUMENTS

| | | | |
|---|---|---|---|
| 3,128,166 | 4/1964 | Mohn | 65/18.2 |
| 3,843,341 | 10/1974 | Hammel et al. | 65/31 X |
| 3,976,535 | 8/1976 | Barns | 156/623 Q X |

FOREIGN PATENT DOCUMENTS

| | | | |
|---|---|---|---|
| 1495831 | 10/1966 | France | 65/18.1 |
| 0003353 | 1/1980 | Japan | 65/18.3 |

*Primary Examiner*—Arthur Kellogg
*Attorney, Agent, or Firm*—Remy J. VanOphem

[57] ABSTRACT

A process is described for manufacturing a product from natural non-transparent quartz (milky quartz), this product being suitable for producing pure quartz glass, as well as a process for processing this product further to produce a shaped body made of pure quartz glass. It is also set forth that this product is suitable as a starting material for growing piezoelectric crystals in an autoclave.

11 Claims, No Drawings

PROCESS FOR MANUFACTURING A PRODUCT SUITABLE FOR PRODUCING PURE QUARTZ GLASS AS WELL AS A PROCESS FOR PRODUCING PURE QUARTZ GLASS FROM THIS PRODUCT

BACKGROUND OF THE INVENTION

1. Field of the Invention

The present invention is concerned with the manufacture of pure quartz glass and relates in particular to the production of a product suitable for producing such pure quartz glass, from types of quartz which have been considered unsuitable for producing pure quartz glass up to now. The invention further relates to the use of the product obtained from such types of quartz according to the invention, for growing piezoelectric crystals.

2. Description of the Prior Art

Ever since quartz was first industrially processed into quartz glass (flint glass) around the turn of the century, crude quartz has been used for this purpose, which was selected from the various deposits according solely to the criterion that it be more or less clear as water but at least transparent.

The quartz glass melted from this raw material was more or less clear as water or at least transparent, also depending on the particular way the method is carried out.

By improving the melting and processing techniques, the transparency and optical behavior of quartz glass melted from crude quartz which was not quite clear as water but only transparent, could be adapted to the properties of quartz glass melted from crude quartz which was clear as water, for example by minimizing the bubble content, homogenization, etc.

It has become increasingly necessary to search for an improvement in the process techniques because the reserves of crude quartz which is clear as water do not suffice to meet the growing demand.

In the known methods for melting quartz glass, the at least transparent crude quartz obtained is broken into pieces of up to approx. 100 g, heated above the alpha-beta transformation point of the quartz of 573° C. and then quenched in soft, demineralized or deionized water.

The extremely pure product thus obtained is then ground down to a grain of less than approx. 1 mm in an agate mill or by means of grinding tools with similarly unproblematic abrasion, sifted, fractionated and possibly subjected to mechanical and/or chemical final cleaning in order to eliminate certain superficial contamination which has come into the product during the reducing process. This product can be melted, for example, in a crucible. A shaped body may be removed from the melt. But the product may also be ground further to an even smaller grain size and then introduced into a gas or plasma burner from which, contained in the flame, it hits a catching body on which a quartz glass body builds up.

There is also a known method (IMC-Spruce-Pine, N.C.) in which pegmatite, because of the feldspar, is processed to a floatable grain $<300$ $\mu$m using customary crushing and grinding tools and the quartz contained in the pegmatite is processed using a combination of mechanical and chemical means to form a raw material which is suitable for customary, but not for higher-quality, quartz glass products. For the extremely pure raw material is contaminated in an undesirable fashion in this method both by flotation residue and by the abrasion of the reducing tools, so that it cannot be used for a large number of applications, in particular for use in optics, in semiconductor technology, in communication engineering (optical fibers) and in the lamp industry.

The demand for quartz glass which has greatly increased in the last ten years or so for a growing number of applications, such as the lighting industry, the semiconductor industry, communication engineering, smelting plants, chemical engineering and optics, confronts the suppliers of crude quartz with problems which can hardly be solved. It is to be expected that the reserves of crude quartz which is clear as water or transparent will shortly no longer meet the constantly increasing demand of the producers of quartz glass. The large reserves of quartz which is not transparent (milky quartz) which do exist have not been exploited for the processing of quartz glass up to now because most of this non-transparent quartz is so contaminated by nature that quartz glass obtained therefrom cannot be used for any subsequent application.

SUMMARY OF THE INVENTION

The invention is based on the problem of stating a process making it possible to produce from non-transparent quartz (milky quartz) a product which is marketable as such and can be used by the producer of quartz glass to produce pure quartz glass if he keeps to certain procedural conditions resulting from a development of the invention when melting this product.

DETAILED DESCRIPTION OF THE INVENTION

This problem is solved according to the invention by the following procedural steps:

(a) grinding the milky quartz obtained from the deposit into pieces of a size in which the pieces are homogeneous in themselves;

(b) washing the pieces obtained in an acid bath and then rinsing them with deionized water;

(c) sorting out the pieces still located in the rinsing bath according to their degree of translucency, eliminating contaminated and/or intergrown pieces, and combining pieces having the same degree of translucency into groups; and (d) separately drying the resulting groups of pieces having the same degree of translucency or grinding them wet or after drying into a granulated material.

The crude milky quartz used consists 99.8% of $SiO_2$. Such crude quartz is found, for example, in Arkansas, U.S.A., in particular in Blocker Lead Mine No. 4. The content of water of crystallization of this crude milky quartz is approx. 0.2%, the total contamination less than 65 ppm.

The following comparison of analyses of quartz which ranges from clear as water to transparent, with milky quartz

|    | Chemical Analysis | |        |
|----|---------|---------------|--------|
|    | transp. | milky quartz  |        |
| Al | 15      | 15            | in ppm |
| Fe | 3       | 3             |        |
| Ca | 1       | 1             |        |
| Mg | 1       | 1             |        |
| Na | 2       | 15–20         |        |
| K  | 2       | 7             |        |

| -continued | | |
|---|---|---|
| | Chemical Analysis | |
| | transp. | milky quartz |
| Li | 1 | 1 |
| Ti | 1 | 1 |
| (others) | kl 10 | kl 20 |
| LOI (%) | kl 0.001 | kl 0.2 |

(analyses: most modern measurement with AAS (ICP 5500 by Perkin Elmer))

shows that, in addition to the considerably higher OH content, in particular the Na and K content of the milky quartz varies up to a considerable degree from the corresponding values of transparent quartz. The Na content is higher by a factor of approx. 10 and the K content by a factor of approx. 3 to 5.

This increased content of Na and K is essentially what gives non-transparent quartz its milky appearance, making it unsuitable for conventional processing to quartz glass.

The product obtained according to the present invention can be used to produce a shaped body according to a process in which quartz is melted in the conventional manner in a crucible made of refractory metal or graphite under low pressure with a temperature increase from 8° to 10° C./per minute up to a temperature higher than 1735° C. and removed as a shaped body from the crucible after a residence time of 10 to 30 minutes and possibly after increasing the pressure, when, in a development of the invention, the inventive quartz is cleaned in an acid bath before being fed into the crucible, then rinsed with deionized water and subsequently dried, whereupon the product treated in this manner is melted in a high vacuum in the degassed crucible by heating it at a temperature higher than 1850° C.

The acid bath preferably consists of hydrofluoric acid.

The melting a high vacuum as was termed essential above takes place advantageously with a vacuum of $10^{-2}$ torr.

Depending on the degree of milkiness of the product obtained according to the inventive process, it may be necessary to include a residence period of 10 to 30 minutes at a temperature of the material slightly higher than 600° C. while heating this product, the shorter residence time applying to quartz which is less milky and the longer residence time to quartz which is relatively milky.

It may be expedient in the case of particularly milky initial products to include, in a further development of the invention, a second residence period of up to 30 minutes at a temperature of the material slightly higher than 1050° C. These measures insure that practically all contamination remaining in the milky quartz, in particular the Na and K, is either expelled directly or at least dissolved from the union of the quartz crystal to the extent that it is completely eliminated during subsequent heating.

It may be particularly expedient to support this cleaning process by keeping the melt at a temperature between 1800° C. and 1850° C. for a period of 30 to 10 minutes before removing the shaped body from the crucible.

The result of the inventive process is quartz glass which no longer differs from quartz glass which has been produced from initial quartz which is completely clear as water.

The ground end product can also be used to produce a shaped body from pure quartz glass, by melting ground quartz in a gas or plasma burner and directing the flame containing the molten quartz towards a catching body on which the quartz glass shaped body builds up, when one starts with granulated material produced according to the invention, reduces it further to a grain size of 90 μm to 300 μm, heats the resulting reduced granulated material to approx. 1050° to approx. 1300° C. for approx. 30 to 20 minutes in an oxygen and/or chlorine atmosphere, cools it down to room temperature again and finally pours it off into the storage vessel of the burner, from which this granulated material is introduced into the burner itself.

The proposed heat treatment of 30 to 20 minutes at approx. 1050° to approx. 1300° C. in an oxygen and/or chlorine atmosphere not only reliably expels the water of crystallization and any gas pockets but also reduces the alkali content, in particular the sodium and potassium content which may be present in the starting material for the inventive product up to ten or fifteen times what is present in quartz which is clear as water.

The burning down of the ground product in the gas or plasma burner takes place in the conventional manner so that it need not be dealt with in more detail.

I claim:

1. A process for manufacturing a product from natural non-transparent quartz (milky-quartz), the product being suitable for producing pure quartz glass, characterized by the steps of:
    (a) reducing the natural non-transparent quartz into pieces which are homogeneous in themselves;
    (b) washing said homogeneous pieces in a strong acid bath for a time sufficient to remove their excess sodium and potassium content;
    (c) rinsing said homogeneous pieces in a purified water solution;
    (d) measuring the translucency of said homogeneous pieces in said purified water solution to identify contaminated and intergrown pieces and groups of pieces having the same degree of translucency;
    (e) separating said groups of pieces identified as having said same degree of translucency, one from the other, and from said contaminated and intergrown pieces to form at least one group of pieces in which all of the individual pieces within said group have the same degree of translucency; and
    (f) granulating said at least one group of pieces to form said product.

2. The process of claim 1 including the steps of heating said product in a crucible to a temperature greater than 1850° C. to melt said product and form a pure quartz shaped body.

3. The process of claim 1 including the step of flame-spraying said product on a catching body to form a pure quartz shaped body.

4. The process of claim 1 including the step of heating said product in an autoclave to grow piezoelectric quartz crystals.

5. A process for producing a shaped body of pure quartz glass from natural non-transparent quartz characterized by the steps of:
    (a) reducing natural non-transparent quartz into pieces which are homogeneous in themselves;
    (b) washing said homogeneous pieces in a strong acid bath for a time sufficient to remove their excess sodium and potassium content;
    (c) rinsing said homogeneous pieces in a pure water solution;

(d) removing all contaminated pieces from among said homogeneous pieces;

(e) measuring the translucency of said homogeneous pieces in said pure water solution to identify at least one group of homogeneous pieces having the same degree of translucency;

(f) separating said groups of pieces identified as having said same degree of translucency, one from the other, to form at least one group in which all of the pieces within said group have the same degree of translucency;

(g) granulating said at least one group of homogeneous pieces having the same degree of translucency to produce a granulated product;

(h) washing said granulated product in an acid bath;

(i) rinsing said washed granulated product in deionized water;

(j) drying said rinsed granulated product; and (k) heating said dried granulated product in a degased crucible to a temperature higher than 1850° C. in a high-vacuum to melt said granulated product and produce a shaped body of pure quartz glass.

6. The process of claim 5 wherein said step of heating includes a first residence period of 10 to 30 minutes at a temperature between 600° C. and 650° C.

7. The process of claim 6 wherein said step of heating includes a second residence period of up to 30 minutes at a temperature between 1050° C. and 1100° C.

8. The process of claim 5 wherein said step of heating includes a third residence period of 30 to 10 minutes at a temperature between 1800° C. and 1850° C. after melting said granulated product at a temperature greater than 1850° C.

9. A process for producing a shaped body of pure quartz crystal glass from natural non-transparent quartz comprising the steps of:

(a) reducing the natural non-transparent quartz into pieces which are homogeneous in themselves;

(b) washing said homogeneous pieces in a strong acid bath for a time sufficient to remove their excess sodium and potassium content;

(c) rinsing said homogeneous pieces in a pure water solution;

(d) measuring the translucency of said homogeneous pieces to identify contaminated and intergrown pieces and groups of pieces having the same degree of translucency;

(e) separating the groups of pieces having the same degree of translucency, one from the other, and from said contaminated and intergrown pieces to form at least one group of pieces in which all of the individual pieces within said group have the same degree of translucency;

(f) granulating said at least one group of homogeneous pieces having the same degree of translucency to produce a granulated product having a grain size ranging from 90 micrometers to 300 micrometers;

(g) heating said granulated product from 30 to 20 minutes in a reactive atmosphere at a temperature between 1050° C. and 1300° C. then cooling to room temperature; and (h) flame-spraying said cooled granulated product on a catching body to produce said shaped body of pure quartz crystal glass.

10. The process of claim 9 wherein said reactive atmosphere is an oxygen atmosphere.

11. The process of claim 9 wherein said reactive atmosphere is a chlorine atmosphere.

* * * * *